United States Patent [19]
Herrick et al.

[11] 3,857,757
[45] Dec. 31, 1974

[54] MEANS FOR THE OXYGEN/TEMPERATURE CONTROL OF AEROBIC FERMENTATIONS

[75] Inventors: Carlyle S. Herrick, Alplaus, N.Y.; James J. Shull, Wayne, Pa.

[73] Assignee: General Electric Company, Schenectady, N.Y.

[22] Filed: Nov. 30, 1972

[21] Appl. No.: 310,862

[52] U.S. Cl.................. 195/109, 195/139, 195/142
[51] Int. Cl............................................ C12b 1/14
[58] Field of Search .......... 195/138, 139, 128, 108, 195/109, 142, 141, 144, 103.5, 121, 125; 210/11, 15, 22, 12, 96

[56] References Cited
UNITED STATES PATENTS
| | | | |
|---|---|---|---|
| 3,015,612 | 1/1962 | Pirt et al............................. | 195/141 |
| 3,462,275 | 8/1969 | Bellamy............................. | 210/11 |
| 3,715,304 | 2/1973 | Hefermeal......................... | 210/12 |

Primary Examiner—A. Louis Monacell
Assistant Examiner—R. B. Penland
Attorney, Agent, or Firm—Leo I. MaLossi; Joseph T. Cohen; Jerome C. Squillaro

[57] ABSTRACT

Apparatus is described for simultaneously supplying the oxygen demands for microbial growth in a biological growth system and controlling the temperature of the system. The growth system contains a quantity of liquid medium for the growth of microorganisms and means are provided to sense the dissolved oxygen content of the liquid medium and to sense the temperature thereof. Each of these parameters is used primarily to control the introduction of one of two different gases to the growth system (and thereupon to the liquid medium) thereby satisfying both the oxygen and the temperature demands of the microorganisms. In practice at least one of the incoming gas flows will be an oxygen-containing gas, e.g., air, and the other gas flow will be pressurized steam, pressurized oxygen, pressurized nitrogen, etc.

18 Claims, 4 Drawing Figures 3,857,757

MEANS FOR THE OXYGEN/TEMPERATURE CONTROL OF AEROBIC FERMENTATIONS

BACKGROUND OF THE INVENTION

A process is described in U.S. Pat. No. 3,462,275 — Bellamy (incorporated by reference) for the growth of thermophilic microorganisms in a liquid medium feeding on solid (or dissolved) organic biodegradable waste materials containing cellulose at temperatures from 45°C to 80°C with agitation while introducing an oxygenating gas to the mixture. The Bellamy patent describes the need for both oxygen input to, and temperature control, for the biological system.

Commercial fermentations generally are conducted in large metal tanks that are surrounded externally by heating jackets and are provided internally with agitating means, means for introducing air flow and a cooling coil. The cooling coil is a substantial portion of the cost of a fermentation reactor. Also, means to circulate a cooling agent through the cooling coil and means for removing heat from the cooling agent must be provided.

It would be of considerable advantage to discover means by which removal of the heat released in a thermophilic biological reaction can be satisfactorily controlled by the use of less costly equipment, whereby a lower cost product may be produced.

Terms such as "gas" and "gaseous" are intended to encompass similar terms indicative of a vapor. The term "growth system" includes the growth medium and those enclosed or defined volumes in flow communication therewith from which gas or gas mixtures maybe made available for mixing with the growth medium.

SUMMARY OF THE INVENTION

The above-noted objective has been achieved in the instant invention wherein apparatus is provided for simultaneously supplying the oxygen demands for growth in an aerobic biological growth system and controlling the temperature of the system. The apparatus comprises in combination: means for defining a growth system containing a quantity of medium for supporting the growth of microorganisms; means for agitating the growth medium; first means for introducing a first gas into the growth system; first means for controlling the rate of flow of the first gas to the first gas introducing means, being connected thereto; second means for introducing a second gas into the growth system; second means for controlling the rate of flow of gas to said second gas introducing means, being connected thereto; means for sensing the dissolved oxygen content of the growth medium; means for sensing the temperature of the growth medium, the first flow rate controlling means being connected to and responsive to signals from the oxygen-content sensing means; and the second flow rate controlling means being connected to and responsive to signals from the temperature-sensing means. At least one of the incoming gas flows is an oxygen-containing gas, e.g., air, and the other gas flow is pressurized steam, pressurized oxygen and/or pressurized nitrogen, etc.

The apparatus of this invention is particularly useful in that it enables conduct of thermophilic fermentation processes at reduced costs of operation.

BRIEF DESCRIPTION OF THE DRAWING

The exact nature of this invention as well as other objects and advantages thereof will be readily apparent from consideration of the following specification relating to the annexed drawing in which.

DESCRIPTION OF THE PREFERRED EMBODIMENT

Biological reactions, particularly the thermophilic aerobic digestion utilized in the Bellamy patent, generally release heat that may have to be removed in a controlled manner from the reaction mass in order to perpetuate the reaction. Ideally the system would be isothermal.

As air is normally supplied to an agitated liquid medium in an aerobic biological growth system through a sparger or porous plate to meet the oxygen demands thereof, a certain amount of cooling action (sometimes excessive) occurs as (a) the bubbles are rapidly heated to the liquid temperature, (b) water evaporates into the interior of the bubble from the surface thereof until the vapor pressure in each bubble reaches the equilibrium vapor pressure of water at the bulk liquid temperature, (c) oxygen exits and carbon dioxide enters the bubble by diffusion and (d) the heat-containing water vapor is removed from the bulk liquid enclosed in the bubbles as they leave the surface. The cooling effect results from the expenditure of latent heat of evaporation by the liquid surrounding each bubble to accomplish the vaporization of water as described.

This cooling action has to date been uncontrolled, because it merely accompanies the introduction of the oxygen-containing gas, the rate of flow of which is dictated by the oxygen demand of the biological mass. In a thermophilic system overcooling will usually result from the requisite air flow rate.

The instant invention optimizes the rate of introduction of the oxygenating gas into the growth system for mixing with the liquid medium and at the same time automatically varies the composition of the oxygenating gas and/or of the bubbles of oxygenating gas. These actions are controlled in response to the temperature and the dissolved (or molecular) oxygen content of the system.

Figure 1:
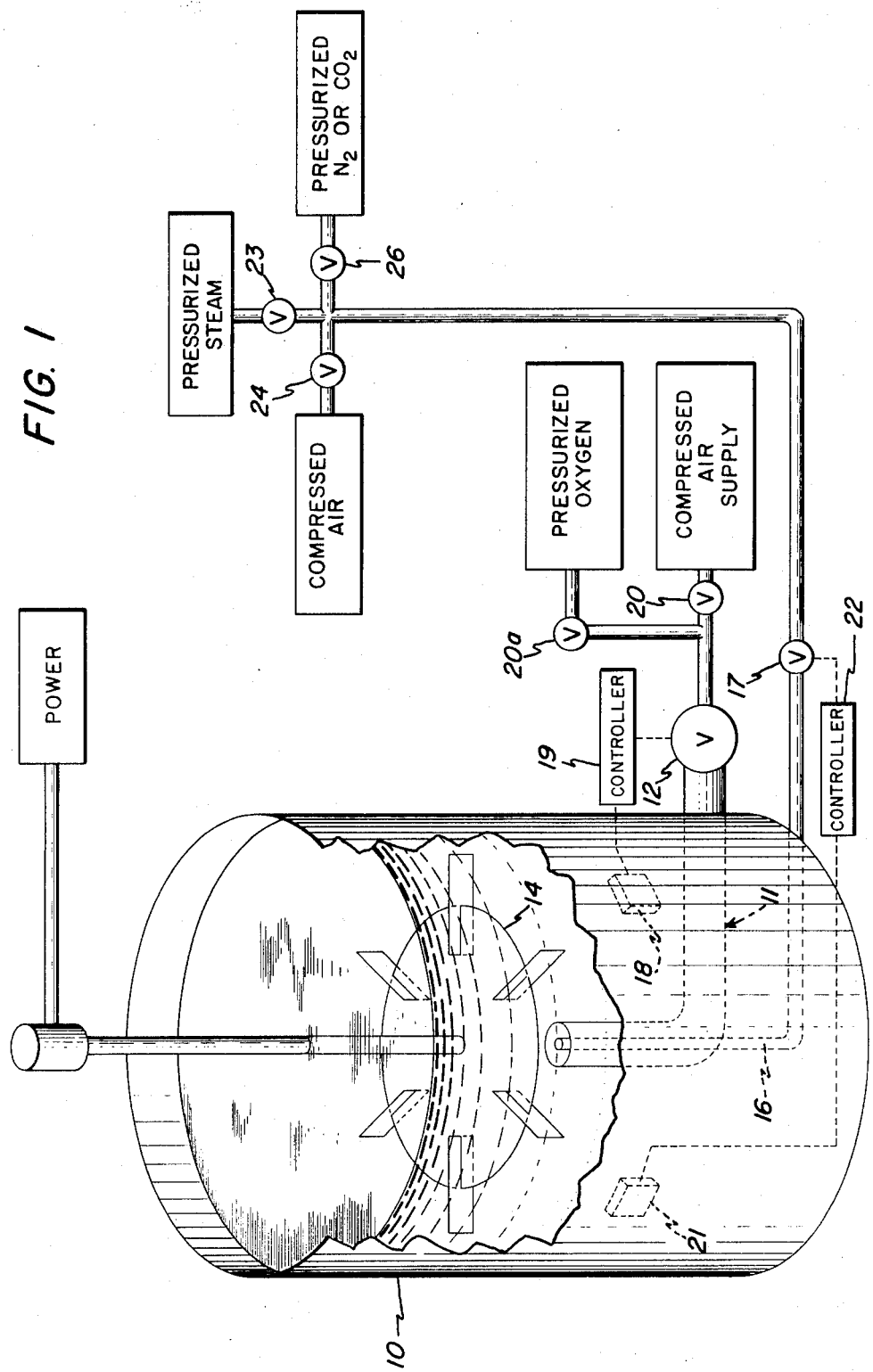
FIG. 1 is a three-dimensional view of a first embodiment of this invention.

In the apparatus of FIG. 1 an aqueous medium for conduct of an aerobic biological reaction is shown in fermentation tank 10. With the arrangement shown, having established a value for the dissolved oxygen concentration to be used in the growth system (e.g., 1–10 ppm), the amount of oxygenating gas (usually air) introduced through a supply conduit 11 is varied as required by automatic actuation of valve 12. The manner of controlling the valve actuator is described hereinbelow.

In this embodiment the air (or pressurized commercial grade oxygen as is described hereinbelow), is discharged into the liquid medium at a point a short distance beneath the center of flat-bladed turbine 14 whereby the maximum amount of bubble surface is developed by the vortices induced around the rotating turbine. The bubbles so formed promote cooling of the aqueous medium by withdrawing latent heat of evaporation therefrom as described hereinabove.

A second gas is introduced into the aqueous medium via gas inlet tube 16 shown concentric with conduit 11 at the discharge end thereof. Pipe 16 serves as the means for the controlled introduction of steam, air and/or an inert gas, such as nitrogen, into the growth system, the rate of introduction thereof being controlled by automatically actuated valve 17.

As will be described hereinbelow the arrangement of sensing and controlling means in FIG. 1 is adapted for either air/stream or air/oxygen operation with the option of introducing supplemental steam or nitrogen. During operation, the requisite amount of dissolved oxygen to meet the biological demand in the growth system is provided by actuation of valve 12 in response to oxygen sensor 18 and controller 19. Oxygen sensor 18 is a commercial unit (e.g., Model E100Fermentation Design Inc., Allentown, Pa.) for determining the amount of dissolved oxygen in the liquid medium. With controller 19 set, for an operating level for 3 ppm dissolved oxygen, when oxygen concentration falls below this value, controller 19 will actuate valve 12 to initiate the introduction of air or oxygen into the aqueous system (depending on whether valve 20 or valve 20a is open), the flow rate being set thereby.

The control mode in any of the sensors referred to herein may be such that the rate of introduction of the gas will vary in direct proportion to the offset (the difference between the set point and the reading); and also according to the time integral of the offset and/or according to the time derivative of the offset.

If, during air/steam operation, the input of air (via valve 20) required to maintain the set point level of dissolved (molecular) oxygen in the bulk liquid is in sufficient quantity so that bubble-cooling of the aqueous medium is greater than desirable, this behavior will be sensed by temperature sensor 21 and, in response to a signal received therefrom by controller 22, valve 17 will be actuated. In normal air/steam operation, valve 23 will be open (valves 24, 26 closed) and pressurized steam will be controllably admitted via valve 17 and conduit 16.

Figure 2:
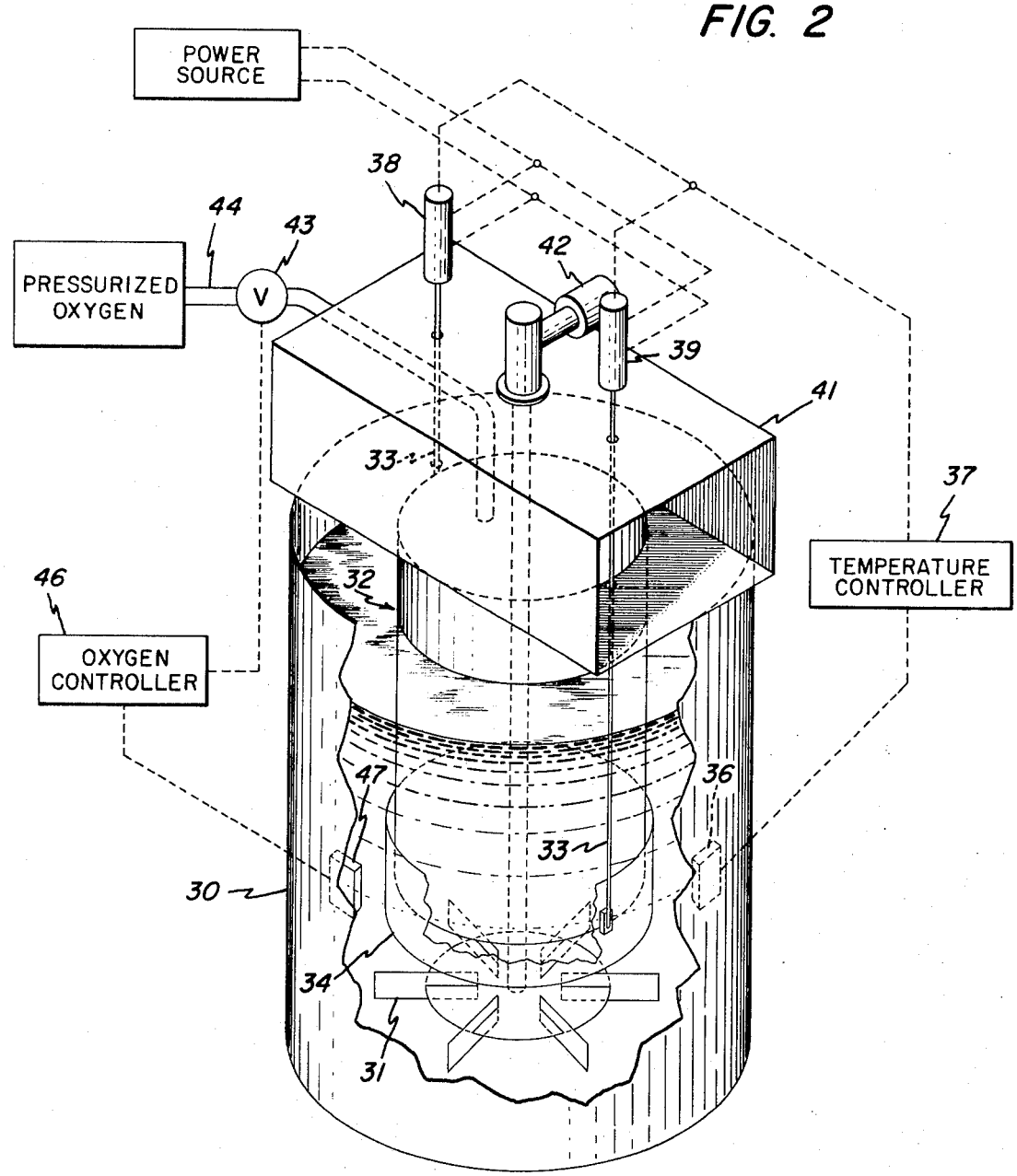
FIG. 2 is a three-dimensional view of a second embodiment of the instant invention utilizing an extendable/retractable draft tube skirt in combination with an agitating turbine.

For air/oxygen operation, to be described in greater detail in relation to FIG. 2, valves 24 (for air) and valve 20a (for oxygen) would be the open valves.

With the entry of steam, the temperature of the system will be caused to rise from the combined effect of (a) the inclusion of humidifying vapor within the air bubbles and, to a lesser extent, (b) the heat content of the steam itself. Steam having entered the air bubbles reduces the amount of water that will evaporate inwardly from the surface of each bubble and thereby will reduce the expenditure of latent heat of evaporation. This reduction in cooling is accomplished without interfering with maintenance of the requisite operating level for oxygen dissolved in the aqueous medium. Automatic initiation and cessation of the introduction of steam and automatic setting of the rate of flow will maintain the temperature conditions preset in sensor 21.

Although electrical connections are indicated between controllers 19, 22 and valves 12, 17, respectively, these valves may be pneumatically actuated.

A second embodiment of the instant invention is set forth for air/oxygen operation in FIG. 2 wherein fermentation tank 30 is shown containing an aerobic biological reaction mass agitated and aerated by turbine 31, which draws air down draft tube 32 and mixes it with the aqueous reaction mass. Some oxygen from the air dissolves in the aqueous system to support the biological life forms growing therein, but (as in the previous embodiment) the bulk of the air remains gaseous in the form of small bubbles swept through the liquid mass by the vortex circulation induced by flat bladed turbine 31. Water evaporates into these bubbles up to the saturation point at the prevailing temperature.

When thermophilic digestion of cellulosic materials is being conducted in the fermentation tank (at operating temperatures of about 45°–80°C), the vapor pressure of water is a substantal part of one atmosphere. Also, at the saturation point for oxygen in an aqueous system in equilibrium with air at 1 atmosphere and 55°C, the maximum dissolved oxygen concentration is about 5 ppm indicating the low equilibrium value of oxygen absorption.

Draft tube 32 is shown as a two-part structure consisting of a fixed upper wall 33 and a lower moveable skirt 34. The arrangement of sensors and controllers shown in FIG. 2 is for operation with air and oxygen as the two gases employed. This combination of gases is, of course, illustrative.

When the temperature sensor 36 senses that the temperature of the liquid reaction mass has risen too much, the signal input to temperature controller 37 is such as to cause activation of servo motors 38 and 39 in a direction to lower skirt 34 supported thereby. As the bottom edge of skirt 34 moves closer to rotating turbine 31, the movement of air into the tank is gradually increased to a point at which sufficient cooling of the bulk liquid occurs and is reflected in the signal from sensor 36 to controller 37 to stop the servos 38, 39. When this increased cooling capability has reduced the temperature of the bulk liquid to a value below the set point for sensor 36, the signal from sensor 36 to temperature controller 37 will cause a reversal of servos 38, 39 bringing about an upward repositioning of skirt 34 as required. If desired, draft tube 32 can be a single piece structure, movable or fixed. When a single movable wall is employed, controlled movement thereof may be effected in the same manner as has been described with respect to skirt 34. If a single fixed wall structure is employed, the position of turbine 31 relative to the bottom edge of the draft tube may be varied by effecting upward or downward movement of the turbine 31 by appropriate activating means.

The open top of draft tube 32 connects aerodynamically and in sealing engagement with draft tunnel 41, that may be closed at both ends or open at one or both ends. If draft tunnel 41 is closed at both ends, vents (not shown) must be provided for the controllable admission of air thereto. Draft tunnel 41 is supported on the wall of tank 30 and may be extended therebeyond to the extent desired to insure the intake of fresh air with minimal recycling of the hot humid air leaving tank 30. The structure of draft tunnel 41 must be capable of supporting draft tube 32, turbine 31, the drive means 42 therefor, etc.

Depending upon the necessity for sterile conditions, the portions of the top of tank 30 not covered by tunnel 41 may be closed or left open. Also, tunnel 41 may be wide enough to cover the full width of tank 30.

The initiation and cessation of the introduction of oxygen and the determination of the rate of flow thereof as the second gas to be introduced to the growth system is effected through the automatic control of valve 43 in conduit 44 by means of oxygen controller 46, which receives appropriate signals from oxygen sensor 47. Thus, when the air input has been curtailed in order to comply with temperature requirements, meeting the oxygen demands of the microorganism growth is assured by supplying oxygen as required through conduit 41.

The second gas is introduced into the upper end of draft tube 32 and is thereby premixed with air in the growth system prior to entry into the growth medium and subsequent bubble formation, the energy for which is provided by agitator 31. In addition to the generation of water vapor within the bubbles so formed, there is, of course, the mutual interchange of oxygen (outward) and carbon dioxide (inward) with the surrounding liquid by gas permeation through the bubble wall.

In the event of premixing of the gases employed (as in FIG. 2 and as may be the case in the embodiment of FIG. 1 by terminating pipe 16 short of the outlet end of conduit 11) the temperature sensor/controller and the oxygen sensor/controller still exert their respective primary control functions. Thus, although in the embodiment in FIG. 2 the temperature control means (sensor 36 and controller 37) directly determines the introduction of air and the introduction of air in turn influences the oxygen concentration in the liquid medium, the oxygen control means (sensor 47 and controller 46) still has the primary responsibility of determining how rich in oxygen the premixed gaseous input must be.

Equipment required in the practice of this invention for the measurement of temperature and dissolved oxygen, the servomotor drives, automatically actuated valves and devices therefor, actuating linkages, etc., and standard commercial items. Although a single inlet pipe has been shown in each embodiment for the introduction of the second gas, a plurality of such inlet pipes may be employed, each connected to a pressurized supply of a different gas.

Figure 3:
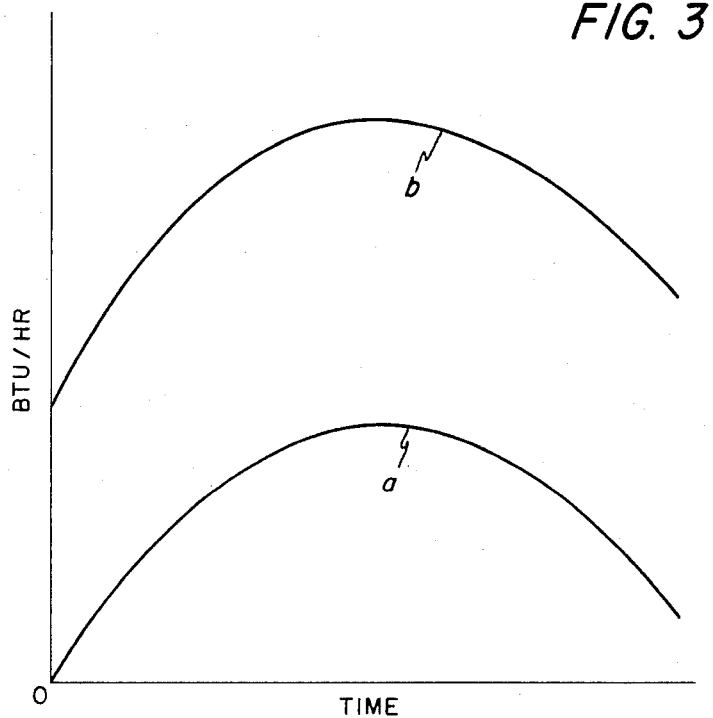
FIG. 3 presents graphic illustrations plotted as a function of time period during which a biological reaction is conducted of a) the metabolic heat release (minus heat losses) per unit of time, for a system having a low heat generation rate (relative to the evaporative heat loss) and b) the heat removed by the air bubbles supplied to the system
Figure 4:
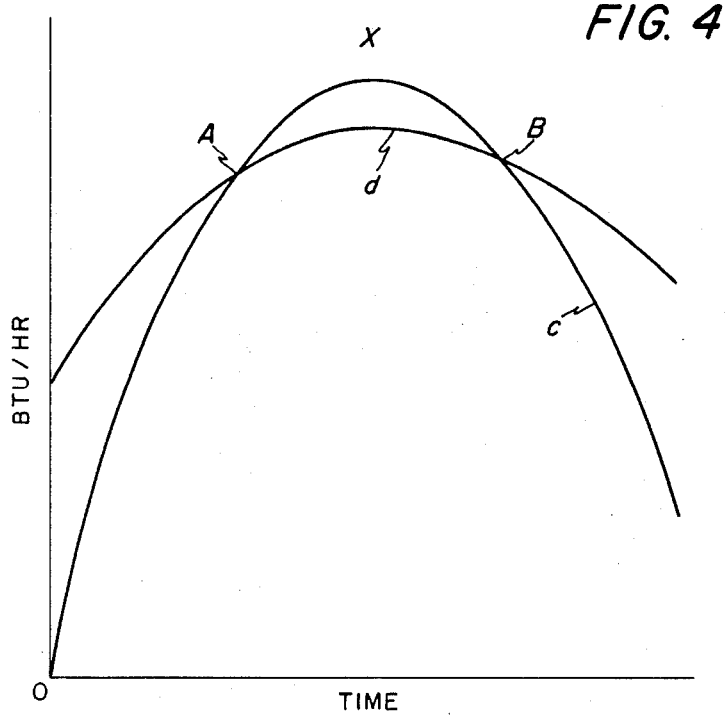
FIG. 4 presents graphic illustrations similar to those of FIG. 3 for a system having a high heat generation rate relative to the evaporative heat loss.

FIGS. 3 and 4 graphically illustrate types of metabolic heat generation that may be encountered in practice in a thermophilic system and the relationship thereof with curves illustrating heat removal by the introduction of the oxygen-containing gas due to water evaporation into the gas bubbles generated therefrom in meeting the oxygen demands of the system.

Curve $a$ of FIG. 3 is illustrative of the "metabolic heat minus heat losses" curve for a biological system having a low rate of heat generation. Curve $b$ represents bubble heat removal encountered in meeting the oxygen demands of the biological system. The considerable space between curve $a$ and curve $b$ is indicative of the aggravated over-cooling condition that can be encountered in a thermophilic system. The practice of this invention is intended to enable curve $b$ to be made coincident with curve $a$ (BTU's removed = BTU's of heat loss) by the proper selection and control of a second gas to be introduced in co-ordination with the air flow. The term "second gas" is intended to cover the situation in which a plurality of gases may be employed in sequence or combined in a single mixed input.

In operation, both heating and oxidation of the system will generally be employed initially. Such initial heating may be accomplished by means of a conventional heating jacket (not shown) around the fermentation tank. Raising of the initial oxygen concentration (to 1–2 ppm dissolved oxygen) is preferably accomplished using the secondary gas (oxygen or oxygen and steam) prior to encountering the cooling effect of the primary gas input (air). Once the growth has been initiated (0 on curve $a$) and the metabolic heat generated in the system increases, the discussions relative to FIGS. 3 and 4 apply illustrating the air/oxygen and the air/steam systems.

If the first and second gases introduced into a biological system that is producing heat at a low rate relative to the evaporative heat loss are air and oxygen, the air input (responsive to temperature sensing) will vary as a function of time from zero to a maximum value and will then reduce to some low value. During this same time the oxygen input (responsive to the oxygen sensor) will be such that the oxygen/air ratio will vary from a maximum to a minimum value (coinciding with maximum air input) and then will gradually increase thereafter.

In a biological system having a low rate of metabolic heat generation wherein air and steam are employed as the main gas inputs, steam (responsive to temperature sensing) is used in initial heating of the system and will be introduced all the way through the process at varying flow rates, because the air introduced (responsive to the oxygen sensing) would otherwise provide overcooling through the entire process as the air input meets the oxygen demand. This is a generalized description of the gas input interrelationships and a specific system would have to be considered for more accurate identification thereof.

As is shown in FIG. 4, in a system producing heat at a high rate, curve $c$ would be representative of the "metabolic heat minus heat losses" as a function of time in a thermophilic system. Curve $d$ indicates the heat removal as a function of time effected by the evaporation of water brought about by the introduction of air in accordance with the oxygen demands of the biological system. A condition in which heat generation exceeds heat removal exists between points A and B where curve $c$ exceeds the maximum of curve $d$.

When such a system is operated with air and oxygen as the main gas inputs, once the system has been initially heated and oxygenated, the air input (responsive to temperature sensing) will increase from zero, only if required for cooling, until point A is reached. Thereafter, air input is increased as required for cooling from A to X; air input is decreased as required for diminishing cooling requirements from X to B and air input continues to decrease from B in accordance with temperature requirements.

The supply of oxygen as the second gas introduced (responsive to oxygen sensing) expressed as the oxygen/air ratio begins at a maximum value, decreases to zero at point A, remains at this value to point B and then increases as is required.

When air and steam are used as the primary gas inputs, in a biological system in which heat is generated at a high rate, the introduction of air will be responsive to the oxygen sensing, while the steam input will be responsive to temperture sensing. After initial oxidation of the system and simultaneous steam input to provide initial heating, the air input required from zero to A to satisfy the biological demand will require the introduction of steam of a decreasing rate to offset the excess cooling effect. Between point A and B the steam would be shut off and the air input would be increased by operation of a control (not shown) overriding the oxygen sensor to provide the requisite cooling effect even though oxygen is being supplied in excess of the biological demand. At point B the introduction of steam would be initiated at an increasing rate to offset the cooling effect of the air input.

This invention is applicable both to batch processing and continuous operation. In a continuous operation separate, but connected, fermentation tanks would be employed each of which would conduct a portion of the specific process. The continuous operation of stirred tank reactors is old in the chemical engineering act.

The functional relationships between tank diameter, agitator placement, agitator diameter, etc. are well known in the mixing art. The choice and location of the agitating means can be varied according to the needs of the growth system. For example, the agitating means may be designed for slow rotation or for high speed rotation.

In its broadest aspects this invention is applicable, as well, to the thermophilic digestion of solids.

Thus, particularly in a thermophilic biological growth process, significant economies can be realized by providing the capability for simultaneous delivery into the growth system of at least two gases, one responsive to an offset from the set point for temperature sensing in the growth medium and the other responsive to an offset from the set point for dissolved oxygen sensing in the growth medium. In each instance one of the two gases will be an oxygen-containing gas (usually air) while the second gas is typically steam or oxygen. The gases introduced into the growth system may be mixed at the point of entry thereof into the growth medium or premixing may be employed.

What we claim as new and desire to secure by letters patent of the United States is:

1. Apparatus for the conduct of controlled aerobic fermentations, said apparatus comprising in combination:
   a. means for defining a growth system and containing a quantity of medium therein for the growth of microorganisms;
   b. means located in said growth system for agitating said medium;
   c. first means in flow communication with said growth system for introducing a first gas thereinto;
   d. first means connected to said first gas introducing means for controlling the rate of gas admission therethrough;
   e. second means in flow communication with said growth system for introducing a second gas thereto;
   f. second means connected to said second gas introducing means for controlling the rate of gas admission therethrough;
   g. means located in said growth system for sensing the molecular oxygen content of said medium;
   h. means located in said growth system for sensing the temperature of said medium;
   i. said first rate controlling means being connected to and responsive to signals from said oxygen-content sensing means and
   j. said second rate controlling means being connected to and responsive to signals from said temperature-sensing means.

2. The apparatus in claim 1 wherein at least one of said first and second gas introducing means is disposed with the discharge end therefore adjacent said agitating means.

3. The apparatus in claim 1 wherein the agitating means comprises a flat-bladed turbine and drive means therefor.

4. The apparatus of claim 3 wherein the first gas introducing means comprises a conduit having the discharge end thereof close to the center of the turbine.

5. The apparatus of claim 1 wherein the first gas introducing means comprises a vertically extending draft tube.

6. The apparatus of claim 5 in which the draft tube is vertically adjustable at least in part.

7. The apparatus of claim 1 wherein the second gas introducing means comprises a conduit.

8. The apparatus of claim 7 wherein the conduit extends into the first gas introducing means for at least part of the length of said conduit.

9. The apparatus of claim 8 wherein the discharge end of said conduit is within a vertically extending draft tube.

10. The apparatus of claim 8 wherein the conduit is disposed within a second conduit as the first gas introducing means.

11. The apparatus of claim 1 wherein each rate controlling means includes a controller device and an automatically adjustable valve operated thereby.

12. A process for the conduct of controlled aerobic fermentations comprising the steps of:
   a. introducing aerobic microbial culture into an aqueous medium containing requisite nutrients and a source of carbon,
   b. raising the oxygen content and temperature of said medium to levels at which the microbial culture can grow and multiply,
   c. continuously sensing the temperature of said medium during the growth cycle,
   d. continuously sensing the dissolved oxygen content of said medium during the growth cycle,
   e. mixing a first gas with said medium continuously during at least part of the growth cycle,
   f. mixing a second gas with said medium continuously during at least part of the growth cycle, said first and second gases being introduced simultaneously during only part of the growth cycle and being intimately mixed during the period of simultaneous introduction,
   g. automatically controlling the rate of addition of said first gas to said medium in response to the temperature sensing,
   h. automatically controlling the rate of addition of said second gas to said medium in response to the sensing of dissolved oxygen in said medium, said second gas being selected from the group consisting of oxygen and air, said first gas being selected from the group consisting of air, steam, nitrogen and carbon dioxide and said first and second gases being different from each other.

13. The process of claim 12 wherein the first and second gases are premixed prior to being mixed with the medium.

14. The process of claim 12 wherein the first gas is air and the second gas is oxygen.

15. The process of claim 12 wherein the first gas is steam and the second gas is air and as air bubbles are formed, the interiors thereof have a high relative humidity.

16. The process of claim 12 wherein the thermophilic organisms are employed, the operating temperature is in the 45°–80°C range and the dissolved oxygen content is maintained in the 1–3ppm range.

17. The process of claim 16 wherein the first gas is air and the second gas is oxygen.

18. The process of claim 16 wherein the first gas is steam and the second gas is air and as air bubbles are formed, the interiors thereof have a high relative humidity.

* * * * *